(12) United States Patent  
Li et al.

(10) Patent No.: US 11,915,599 B2  
(45) Date of Patent: Feb. 27, 2024

(54) GRID BASED PATH SEARCH METHOD FOR UAV DELIVERY OPERATIONS IN URBAN ENVIRONMENT

(71) Applicants: City University of Hong Kong, Hong Kong (HK); Hangzhou Antwork Network Technology Co., Ltd., Hangzhou (CN)

(72) Inventors: Lishuai Li, Hong Kong (HK); Fang He, Wuhan (CN); Lei Zhang, Hangzhou (CN)

(73) Assignees: City University of Hong Kong;, Hong Kong (HK); Hangzhou Antwork Network Technology Co., Ltd., Hangzhou (CN)

( * ) Notice: Subject to any disclaimer, the term of this patent is extended or adjusted under 35 U.S.C. 154(b) by 179 days.

(21) Appl. No.: 17/468,615

(22) Filed: Sep. 7, 2021

(65) Prior Publication Data

US 2022/0108621 A1   Apr. 7, 2022

Related U.S. Application Data

(60) Provisional application No. 63/075,418, filed on Sep. 8, 2020.

(51) Int. Cl.
*G08G 5/00* (2006.01)
*G05D 1/04* (2006.01)
(Continued)

(52) U.S. Cl.
CPC ......... *G08G 5/0039* (2013.01); *B64C 39/024* (2013.01); *G05D 1/042* (2013.01); *G08G 5/0034* (2013.01); *B64U 2101/00* (2023.01)

(58) Field of Classification Search
CPC .. G08G 5/0039; G08G 5/0034; G08G 5/0069; G08G 5/0026; B64C 39/024; G05D 1/042; B64U 2101/00; G01C 21/20
See application file for complete search history.

(56) References Cited

U.S. PATENT DOCUMENTS

| 2009/0210109 | A1 | 8/2009 | Ravenscroft |
| 2010/0094485 | A1* | 4/2010 | Verlut .................. G01C 21/005 701/3 |

(Continued)

FOREIGN PATENT DOCUMENTS

| CN | 104075717 A | 10/2014 |
| CN | 102759357 B | 11/2014 |

(Continued)

*Primary Examiner* — Abby Y Lin
*Assistant Examiner* — Dylan M Katz
(74) *Attorney, Agent, or Firm* — Idea Intellectual Limited; Margaret A. Burke; Sam T. Yip

(57) ABSTRACT

The present invention provides a method for planning a shortest possible three-dimensional path for autonomous flying robots to traverse from one location to the other in a geographical region, including translating a three-dimensional (3D) environment, discretizing the 3D environment into a graph of many grid cells or nodes, employing a modified any-angle path planning algorithm to calculate non-uniform traversal cost of each grid cell and by averaging the total traversal costs along the path to shorten the corresponding computation time, whilst incorporating operational costs other than the traversal cost specific to the autonomous flying robots to be traversed. The shortest possible path found by the present method does not only consider the path length, but also takes different costs of traversing and operating the flying robots into account, which increases its feasibility and flexibility to be applied in a wide variety of situations and technological areas.

17 Claims, 9 Drawing Sheets

(51) Int. Cl.
   *B64C 39/02*     (2023.01)
   *G05D 1/00*      (2006.01)
   *B64U 101/00*    (2023.01)

(56) References Cited

U.S. PATENT DOCUMENTS

| | | | |
|---|---|---|---|
| 2016/0003620 A1* | 1/2016 | Kapoor | G08G 5/0021 |
| | | | 701/400 |
| 2016/0210863 A1* | 7/2016 | Kohn-Rich | G05D 1/102 |
| 2017/0162060 A1* | 6/2017 | Boland | G08G 5/0034 |
| 2018/0268720 A1* | 9/2018 | Sharma | G05D 1/101 |
| 2018/0308371 A1 | 10/2018 | Cao et al. | |
| 2019/0107408 A1 | 4/2019 | Stroman et al. | |

FOREIGN PATENT DOCUMENTS

| | | |
|---|---|---|
| CN | 103676944 B | 11/2016 |
| CN | 107037829 A | 8/2017 |
| CN | 105487554 B | 1/2018 |

* cited by examiner

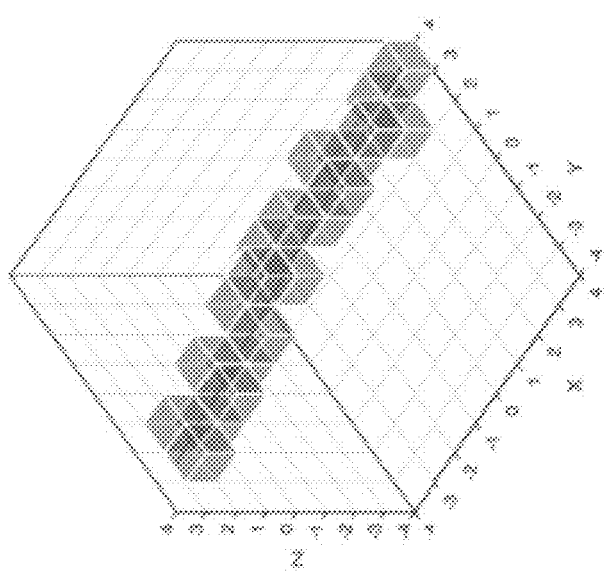
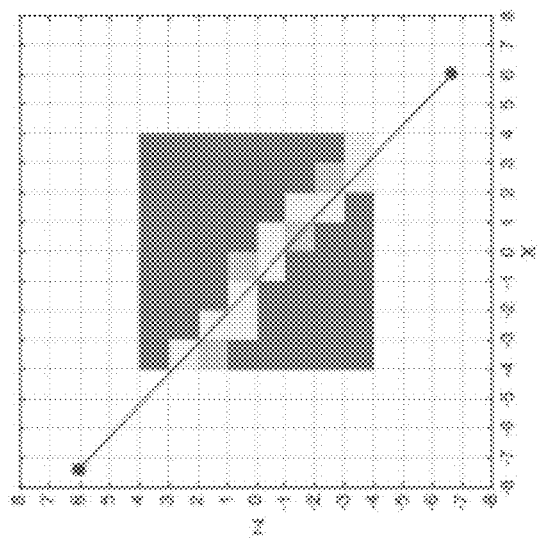
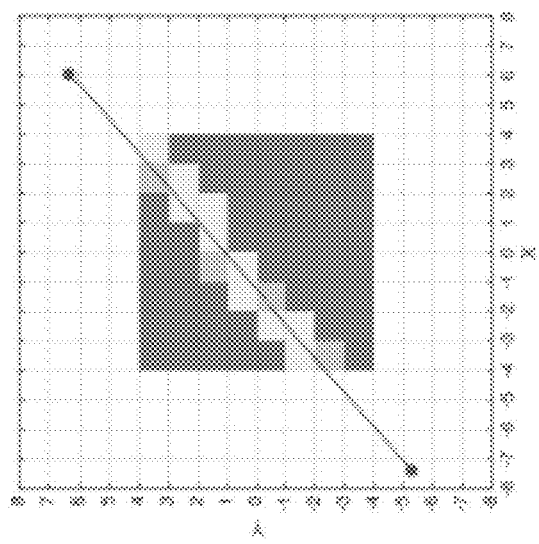
FIG. 2 (Prior Art)

```
41  UpdateVertex(s,s')
42    if LineOfSight(parent(s), s') then
43      /* Path 2 */
44      if g(parent(s)) + c(parent(s), s') < g(s') then
45        g(s') := g(parent(s)) + c(parent(s), s');
46        parent(s') := parent(s);
47        if s' ∈ open then
48          open.Remove(s');
49        open.Insert(s', g(s') + h(s'));
50    else
51      /* Path 1 */
52      if g(s) + c(s, s') < g(s') then
53        g(s') := g(s) + c(s, s');
54        parent(s') := s;
55        if s' ∈ open then
56          open.Remove(s');
57        open.Insert(s', g(s') + h(s'));
58  end
```

FIG. 5 (Prior Art)

46 SetVertex(s)
47 if *NOT* lineofsight(parent(s), s) then
48     /* Path 1 */
49     $parent(s) := argmin_{s' \in nghbr_{vis}(s) \cap closed}(g(s') + c(s', s));$
50     $g(s) := min_{s' \in nghbr_{vis}(s) \cap closed}(g(s') + c(s', s));$
51 end
52 ComputeCost(s, s')
53     /* Path 2 */
54 if $g(parent(s)) + c(parent(s), s') < g(s')$ then
55     $parent(s') := parent(s);$
56     $g(s') := g(parent(s)) + c(parent(s), s');$
57 end

FIG. 6 ically based on the disclosure of which is incorporated herein by reference in its entirety.

GRID BASED PATH SEARCH METHOD FOR UAV DELIVERY OPERATIONS IN URBAN ENVIRONMENT

CROSS-REFERENCE WITH RELATED APPLICATIONS

The present application claims priority from the U.S. Provisional Patent Application No. 63/075,418 filed Sep. 8, 2020, and the disclosure of which is incorporated herein by reference in its entirety.

FIELD OF THE INVENTION

The present invention relates to path planning for robotics. In particular, the present invention relates to a three-dimensional path planning method for unmanned aerial vehicles in the context of autonomous delivery operations based on an any-angle path planning algorithm to search for the nearest grid path whilst taking path length, safety risks involved, operational cost into account when calculating the nearest grid path in a complex urban environment.

BACKGROUND

Unmanned vehicles are either controlled remotely, or operated autonomously in part or in full without human supervision. Unmanned aerial vehicles (UAVs) are one of the most popular examples and have become more and more popular in our daily life because of its wide variety of applications across professional and entertainment sectors, including but not limited to, military, inspection, surveillance, security, search and rescue, precision agriculture, wireless communication technology, delivery of goods, navigation, and film making. As an alternative to traditional logistic solutions, in a complex urban environment, a relatively shorter distance delivery service by UAVs can avoid the problems of using traditional transportation on land such as road traffic, pollutions, delay caused by human interventions, and inaccessibility in some areas due to non-existence of road to connect. Using UAVs to deliver goods is also believed to lower the maintenance cost and improve the mobility as compared to using traditional vehicles on road to deliver goods.

However, UAVs as an alternative to the traditional logistic transportation also have their limitations. For example, UAVs need to fly at certain altitude, and have to avoid tall buildings, non-fly zones, and densely populated areas during the flight. Operational cost is another consideration when UAVs are treated as an alternative to the traditional logistic transportation for delivering goods. Therefore, how to plan the shortest whilst cost-effective path in a three-dimensional environment, especially in urban areas with relatively more tall structural objects and moving obstacles than suburbs, becomes more challenging and complex than traditional two-dimensional path planning.

The most common techniques used in 3D path planning for UAVs in the context of providing delivery services of goods or other commodity include sampling-based path planning such as Rapidly-exploring Random Trees and Probabilistic Roadmaps, which samples the environment and search randomly to find an optimal path.

Another type of path planning technique is graph search-based path planning, which discretizes continuous environment into a grid with blocked and unblocked grid cells and use some path planning algorithms to find the shortest path on the resulting grid graph. Graph based path planning algorithms include Dijkstra's algorithms, A*, Lifelong Planning A*, Dynamic A* (D*) and D*-Lite, Theta*, Lazy Theta*, etc.

Mathematical optimization-based path planning rewrites the path planning problem as an optimization problem and solves it by using an optimization method, including but not limited to, Linear Programming and Optimal Control, Binary Linear Programming, Mixed-Integer Programming, Non-linear Programming, etc.

Meta-heuristic-based path planning includes various evolutionary algorithms, neural network-based algorithms, artificial potential field algorithms etc.

Among various types of common path planning techniques, grid-based path planning algorithms are able to find the optimal or near optimal path with reasonable time, space complexity and cost due to their discretization and deterministic nature of search mechanism. By adjusting grid step size, the quality of paths and computation speed can be easily controlled.

Among different types of graph-based path planning algorithms, Dijkstra's algorithm is one of the very first uniform cost search based algorithms to find the shortest path between nodes; A* search algorithm is an extension to Dijkstra's algorithm with better performance by using heuristics to guide its search. However, paths formed by graph edges are not smooth, and longer than shortest possible paths because the path heading for a grid cell is constrained by the neighboring cells. Post-processing can only smoothen paths but cannot result in the shortest possible paths because the homotopy remains unchanged.

Theta* extends A* algorithm to find paths without constraining the headings of the paths by propagating information along grid edges, but it requires to perform a time-consuming line-of-sight check for each unexpanded visible neighbor of the currently expanded grid cell.

Lazy Theta* is a faster version of Theta* by using lazy evaluation to perform only one line-of-sight check per expanded grid cell instead of one visibility check per generated grid cell, but it would increase the number of cell expansions and potentially the length of the resulting path. Basic principles of how Theta* and Lazy Theta* perform path planning on grid cells are illustrated in FIG. 1.

Any-angle path planning algorithms work well with uniform grid traversal cost, but in a complex environment or when the environment becomes larger, the traversal cost is usually non-uniform because there may be flying zones and those zones may have different levels of risks. Any-angle path planning algorithms can be extended to non-uniform traversal cost but should also take other risks into account such as turning angle, climbing/descending angle, in addition to path length when calculating the cost, or should be restricted to a feasible range.

However, none of the foregoing techniques provide a unique solution for at least the following drawbacks in the prior art: (1) time-consuming to find a path in a large size of three-dimensional search space (the curse of dimensionality); (2) paths generated by current any-angle path planning algorithms are unnatural, non-smooth and/or incompatible with vehicle dynamics of UAVs; and (3) different level of risks and/or non-uniform traversal cost of each grid arising from a complex 3D urban environment is/are not considered when calculating the traversal cost of each grid.

Therefore, there is an unmet need to provide a method to discretize complex three-dimensional (3D) urban environment with large number of obstacles into grid cells and how to assign each grid with traversal cost (both uniform and non-uniform) according to specific features of the search space therein, and based on a modified any-angle path planning algorithm to search a near optimal grid path between a given pair of origin and destination by taking various factors into account including but not limited to path length, safety risks, and UAV operational cost (e.g., path turning, climbing/descending cost, etc.).

SUMMARY OF THE INVENTION

Accordingly, in a first aspect, the present invention provides a method for planning a shortest possible three-dimensional path of an autonomous flying robots to traverse from one location to another in a geographical region, including: translating the geographical region into a three-dimensional environment; discretizing the three-dimensional environment into a graph comprising a plurality of three-dimensional cells or nodes; deriving a path between a first node and a last node in the graph to be traversed by the autonomous flying robots; assigning a weighting factor to each of the nodes, the weighting factor being associated with traversal cost of the autonomous flying robots in each of the nodes, and calculating the traversal cost of the autonomous flying robots from one node to the other along the path; checking line-of-sight between the first node and the last node of the path; adding other costs into an any-angle path planning algorithm and approximating thereof to generate a natural and smooth path compatible with vehicle dynamics of the autonomous flying robots in order to obtain the shortest possible three-dimensional path of the autonomous flying robots between two locations in the geographical region.

In accordance with an embodiment, the autonomous flying robots include unmanned aerial vehicles (UAVs), micro aerial vehicles (MAS), and alike used in unmanned aerial system (UAS).

In accordance with an embodiment, the calculation of the traversal cost is based on an approximation of an average traversal cost of at least one known path and comparison with an average traversal cost of a new path.

In accordance with an embodiment, the grid size is decreased to substantially zero when calculating the traversal cost.

In accordance with an embodiment, the other costs of the path is calculated by converting the path into a plurality of segments each representing a partial path to be traversed by the autonomous flying robots, determining relative horizontal and/or vertical orientations of the autonomous flying robots between every two consecutive segments, and calculating the costs in addition to the traversal cost of the path on changing the autonomous flying robots from one orientation to the other according to the determined relative horizontal and/or vertical orientations between the two consecutive segments.

In accordance with an embodiment, the other costs of the path include costs associated with one or more of turning costs of the autonomous flying robots between two consecutive segments within the path, climbing costs and descending costs of the autonomous flying robots at the first node and the last node, respectively.

In a specific embodiment, the turning costs of the autonomous flying robots include the costs involved in adjusting, meeting or overcoming horizontal turning angle, adjacent turning distance, and consecutive turning decay of the autonomous flying robots.

In another specific embodiment, the climbing or descending costs include the costs involved in adjusting, meeting or overcoming climbing or descending angle, the linear weight cost multiplier, climbing or descending angle threshold of the autonomous flying robots.

In accordance with an embodiment, the other costs of the path are added into the any-angle path planning algorithm as corresponding terms to heuristics of the algorithm.

Other aspects of the present invention include a method of using the path planning method described herein in computer or video game industry where in those games, players moving their character from one origin to a target location, if autonomous, need to avoid obstacles, non-access or undesired zone, and/or subject to different speed constrains. The concept of incorporating non-uniform traversal cost into path planning in a complex three-dimensional environment and the approximation method of calculating the same in each of the grid cells in a graph converted from the three-dimensional environment of a geographical location proposed in the present invention should also be applicable to the scenario of a computer or video game, notwithstanding the game environment is two- or three-dimensional.

Advantages of the present invention over the prior arts:
(1) To provide a solution in a large size of a three-dimensional search space within a short period of time;
(2) Paths as-generated should be natural, smooth and compatible with vehicle dynamics;
(3) Different level of risks and other operational costs, in addition to non-uniform traversal cost of each grid, have been taken into account such that a natural and smooth whilst time-efficient and cost-effective path in terms of computation and operation is found.

Although the various embodiments of the present invention are described based on path planning for traversal of autonomous flying robots, a skilled person in the art can appreciate that the present invention is readily adoptable and applicable in path planning for other types of unmanned vehicle including, but not limited to, autonomous/unmanned land-based vehicles and robots, marine autonomous/unmanned surface and underwater vessels without undue experimentation and departure from the spirit and objectives of the present invention.

BRIEF DESCRIPTION OF THE DRAWINGS

Embodiments of the invention are described in more details hereinafter with reference to the drawings, in which:

FIG. 2 illustrates how to check line-of-sight between two expanded cells according to three-dimensional voxel traversal (top panel) and corresponding projections onto two-dimensional plane (bottom left panel represents x-y plane; bottom right panel represents x-z plane) of the path found by Theta* or Lazy Theta*;

FIG. 5 shows path comparison by Theta* algorithm to compare the two adjacent paths with the new path as shown in FIG. 3;

FIG. 6 shows path comparison by Lazy Theta* algorithm to approximate cost of the new path by using the longer adjacent path instead of the shorter adjacent path as shown in FIG. 3;

DETAILED DESCRIPTION OF THE INVENTION

In the following description, systems and methods for path planning for traversal of autonomous and unmanned vehicles and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

It should be apparent to practitioner skilled in the art that the foregoing examples of the system and method are only for the purposes of illustration of working principle of the present invention. It is not intended to be exhaustive or to limit the invention to the precise forms disclosed.

Figure 1:
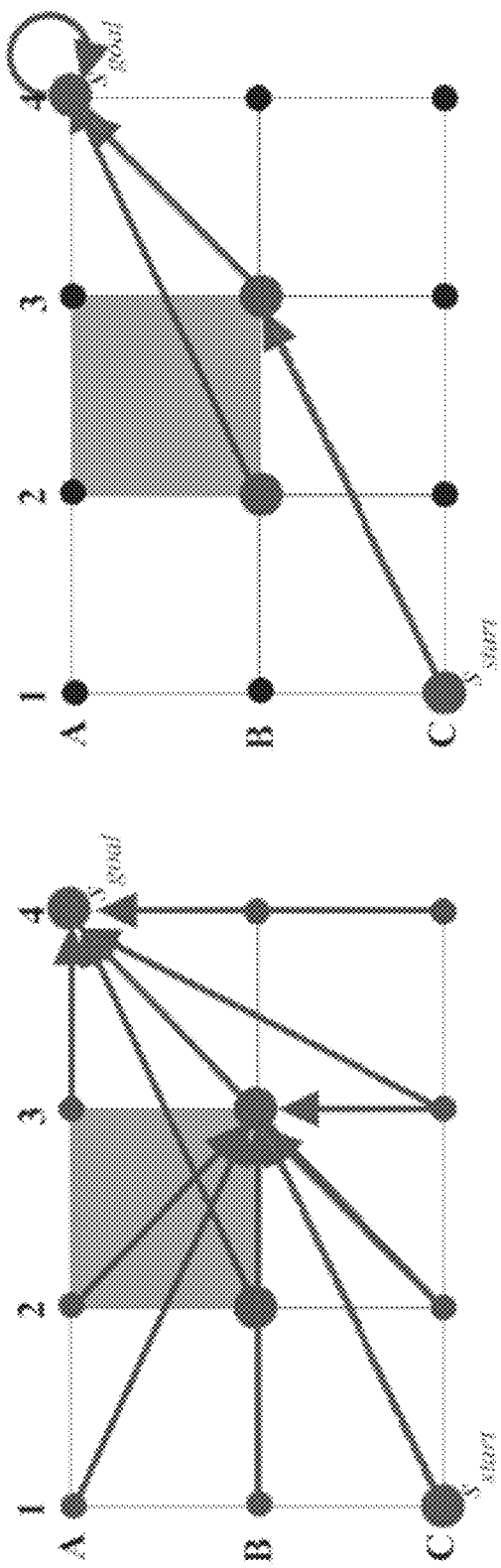
FIG. 1 schematically depict how path is found by Theta* and Lazy Theta* on expanded grids and how many line-of-sight is/are checked by each of the algorithms.

As compared to A* algorithm, by using some any-angle path planning algorithms like Theta*, paths can be found without constrains to headings of the paths; Lazy Theta* can even reduce the time of line-of-sight checks and generate substantially identical result to that from Theta*, only the path length may be longer by using Lazy Theta*. As shown in FIG. 1, the key difference between Theta* (left panel) and Lazy Theta* (right panel) can be found in terms of the number of line-of-sight checks, which is defined by the number of neighboring cells the solid arrows have crossed, where the corresponding path found by each of the algorithms is represented by the broken arrow. The total number of line-of-sight checks by Theta* is 15 while that by Lazy Theta* is just 4 in this example because Lazy Theta* adopts lazy evaluation to only perform one line-of-sight check per expanded grid cell, as compared to Theta* which performs line-of-sight check for each of the unexpanded visible neighboring grid cells of the currently expanded grid cell. However, Lazy Theta* increases the number of cell expansions, and thereby potentially lengthens the resulting path.

Incorporation of Non-Uniform Traversal Cost of Flying Robots into Path Finding

Figure 3:
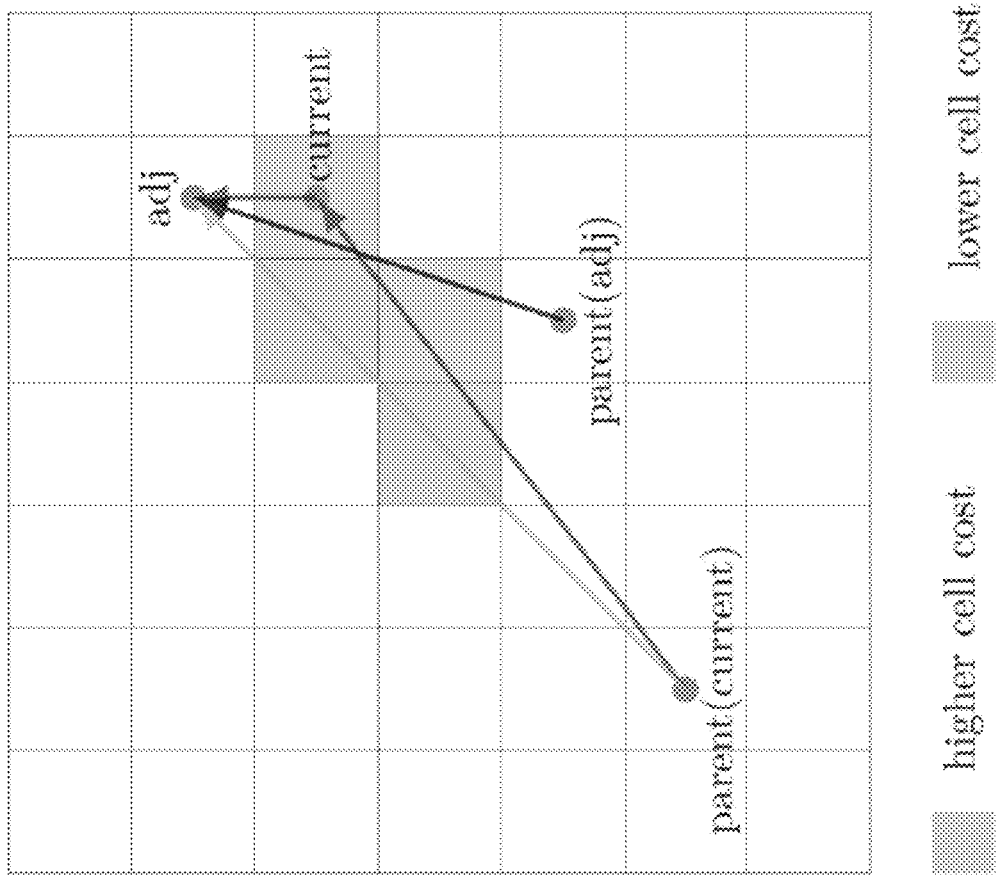
FIG. 3 illustrates a modified any-angle path planning method incorporated with non-uniform traversal cost of each traversed cells for optimal path finding.

FIG. 3 illustrates how to determine an optimal path from one node to the other based on calculating the non-uniform traversal cost. Theta* basically finds paths on grids that contain unblocked cells with uniform traversal costs. In that case, the true shortest path found by Theta* have heading changes only at the corners of the blocked cells and the triangle inequality holds. If non-uniform traversal cost is incorporated into the calculation of the path finding, it will no longer unconditionally choose the true shortest path based on path length but will be based on the path costs. To do so, the algorithm needs to compare the non-uniform traversal cost in each grid which overlap with the path and those with its adjacent paths. In this example, three different paths are compared: a first one from parent (adj) to adj; a second one from parent (current) to current to adj; a third one from parent (current) to adj. However, by computing and calculating non-uniform traversal cost as such, the true shortest paths may still have heading changes at the boundaries between unblocked cells having different traversal costs, and therefore the triangle inequality no longer holds.

Figure 4:
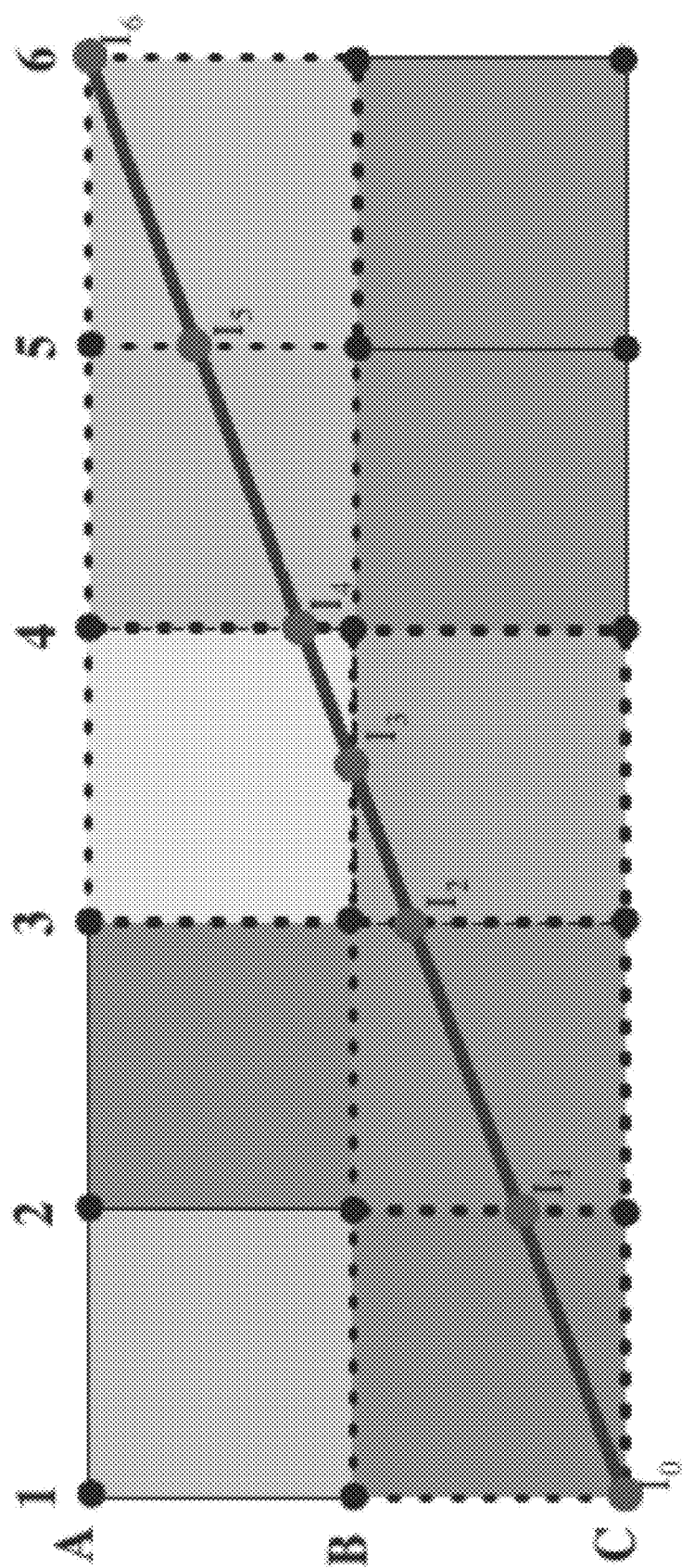
FIG. 4 schematically depicts a conventional method to segment a known path for calculation of the total traversal cost along the path.

FIG. 4 shows an example of how a path is segmented for calculation of the traversal cost during line-of-sight check by Theta*. The calculation uses Cohen-Sutherland clipping algorithm (Foley et al., 1992) from computer graphics. The straight line in this figure represents the path, and it is segmented into several line segments ($I_0$, $I_1$, $I_2$, . . . ) at the points where it intersects with the boundaries of the cells from C1 to A6 vertices. The path cost of the path along $\overline{C1A6}$ based on this calculation method is the sum of the costs of each line segment $\overline{I_iI_{i+1}}$ and the cost of each line segment is the product of its length and the traversal cost of the corresponding unblocked cell.

Approximation of Average Non-Uniform Traversal Cost

Both Theta* and Lazy Theta* have to perform line-of-sight check, they have to go through a voxel traversal process between two examined cells and to check whether every traversed cell is accessible to the flying robots (FIG. 2). Also, because special areas in an urban environment such as densely populated area and desired flying zones within where the cost of every cell overlapping with the path also need to be considered, if the non-uniform traversal costs of each of the blocks on the line segments had to be calculated, the computation would have been very time-consuming, as follows:

$$f(\text{cell}) = \sum_{c \in S} costCoef(c) \qquad (1)$$

$$\|lineSegment(\text{cell}, parent(\text{cell})) \cap c\|_2 \qquad (2)$$

$$S = voxelTraversal(\text{cell}, parent(\text{cell})). \qquad (3)$$

Therefore, the present invention incorporates an approximation method to calculate the traversal cost into the existing algorithm to result in a modified Lazy Theta*, as follows:

$$f(\text{cell}) = \frac{1}{size(S)} \|lineSegment(\text{cell}, parent(\text{cell}))\|_2 \qquad (4)$$

$$\sum_{c \in S}(costCoef(c)) \qquad (5)$$

$$S = voxelTraversal(\text{cell}, parent(\text{cell})). \qquad (6)$$

Instead of calculating the product of the precise length of each segment and the associated traversal cost, the present invention proposes calculating an average cost of the traversed cells on the path and thereby defining the average cost as the path cost. By this approximation method, the computation time is significantly reduced, and the cost on overlapping calculation is not saved. However, the path length may be increased or accuracy may be reduced. To alleviate the negative effect of these shortcomings, grid size is significantly reduced to substantially zero during computation.

Turning Cost

UAVs consume more energy when performing turns, thus, the present invention further incorporates penalty to penalize paths with unnecessary or excessive turns, in addition to the average non-uniform traversal cost among the traversed cells along the path as path cost, as follows:

$$f(s) + g(s) + h(s) + t(s) \quad (7)$$

$$t(s) = \gamma_t t(\text{parent}(s)) + \lambda\phi(s)\left(1 + \eta e^{\frac{\|\lambda_1\|}{d_0}}\right) \quad (8)$$

$$\phi(s) = \left|\arccos\left(\frac{l_1 \cdot l_2}{\|l_1\|\|l_2\|}\right)\right| \quad (9)$$

$$l_1 = s - \text{parent}(s) \quad (10)$$

$$l_2 = \text{parent}(s) - \text{parent}(\text{parent}(s)) \quad (11)$$

The turning cost is considered as a linear function of the turning angle $\emptyset(s)$ between every two consecutive segments; the linear weight $\lambda$ is tunable to trade-off between path length and path turning; assuming turns are very close to each other, short previous segment length $\|l_1\|$ is penalized; a decay factor $\gamma_t$ is added to the turning cost of the parent cell in consideration of consecutive turns.

Climbing or Descending Cost:

Climb cost is calculated for en-route section because take-off and landing from or to a terminal area by some of the flying robots such as UAV require a large absolute climb/descending angle, resulting in a large climb/descending cost. Hence, in the following equations, both s and parent(s) are considered to be located in different terminal areas in order not to overwhelm the other costs, in addition to the non-uniform traversal cost for optimal path finding:

$$f(s) + g(s) + h(s) + t(s) + c(s) \quad (12)$$

$$c(s) = \lambda_c \gamma(s)\|l_1\| \quad (13)$$

$$\gamma(s) = \begin{cases} \left|\arcsin\left(\frac{l_1 \cdot n}{\|l_1\|}\right)\right| & \text{penalize climbing and descending} \\ \arcsin\left(\frac{l_2 \cdot n}{\|l_1\|}\right) & \text{penalize climbing} \end{cases} \quad (14)$$

$$l_1 = s - \text{parent}(s) \quad (15)$$

$$n = \begin{bmatrix} 0 \\ 0 \\ 1 \end{bmatrix} \quad (16)$$

where g(s) is the length of the shortest path from start vertex to vertex s found so far, and thereby is an estimate of the start distance of vertex s; h(s) is an estimate of the goal distance of vertex s; t(s) is the traversal cost obtained from Eq. (8); c(s) is other costs in addition to t(s) en route.

To ensure that no route segment has climb or descending angle exceeding an absolute threshold $\varepsilon_c$, the cost function in Eq. (13) is changed to a piece-wise function as follows:

$$c(s) = \begin{cases} \lambda_c \gamma(s)|l_1| & \gamma(s) \le \varepsilon_c \\ +\infty & \gamma(s) > \varepsilon_c \end{cases} \quad (17)$$

Examples

Figure 7:
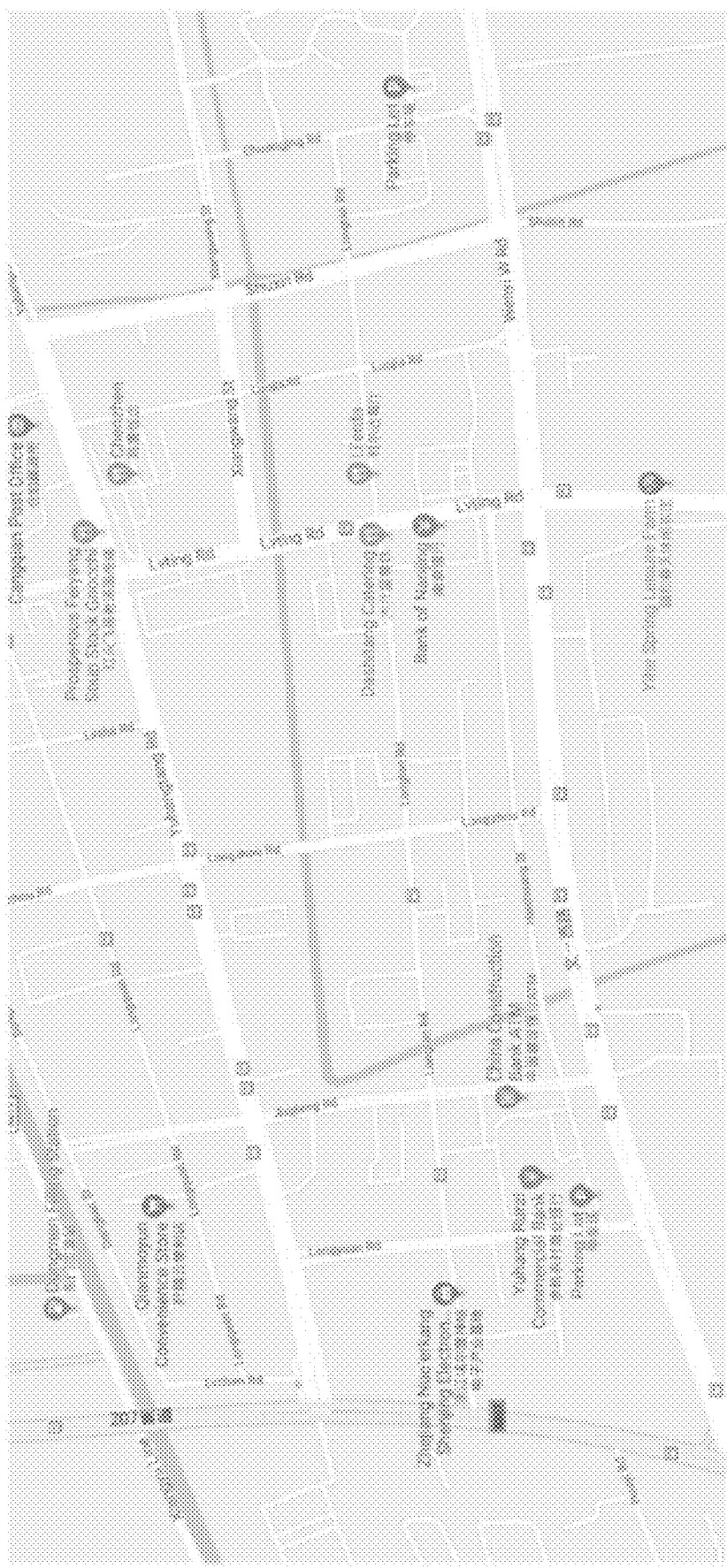
FIG. 7 illustrates how large is the area of an urban environment where a test is conducted according to an embodiment of the present invention.
Figure 8:
FIG. 8 illustrates what elements in a three-dimensional environment and how they are abstracted and approximated in a test of the present method according to an embodiment of the present invention.

Taking the geographical region as shown in FIG. 7 as an example of how different structural elements/obstacles are adjusted to reflect the actual height an UAV needs to fly (about 90 m to 120 m above the ground level). As shown in FIG. 8, buildings, non-fly zones and special traversal cost areas in a geographical region are abstracted/approximated by convex polyhedrons or polygons before discretization.

Figure 9:
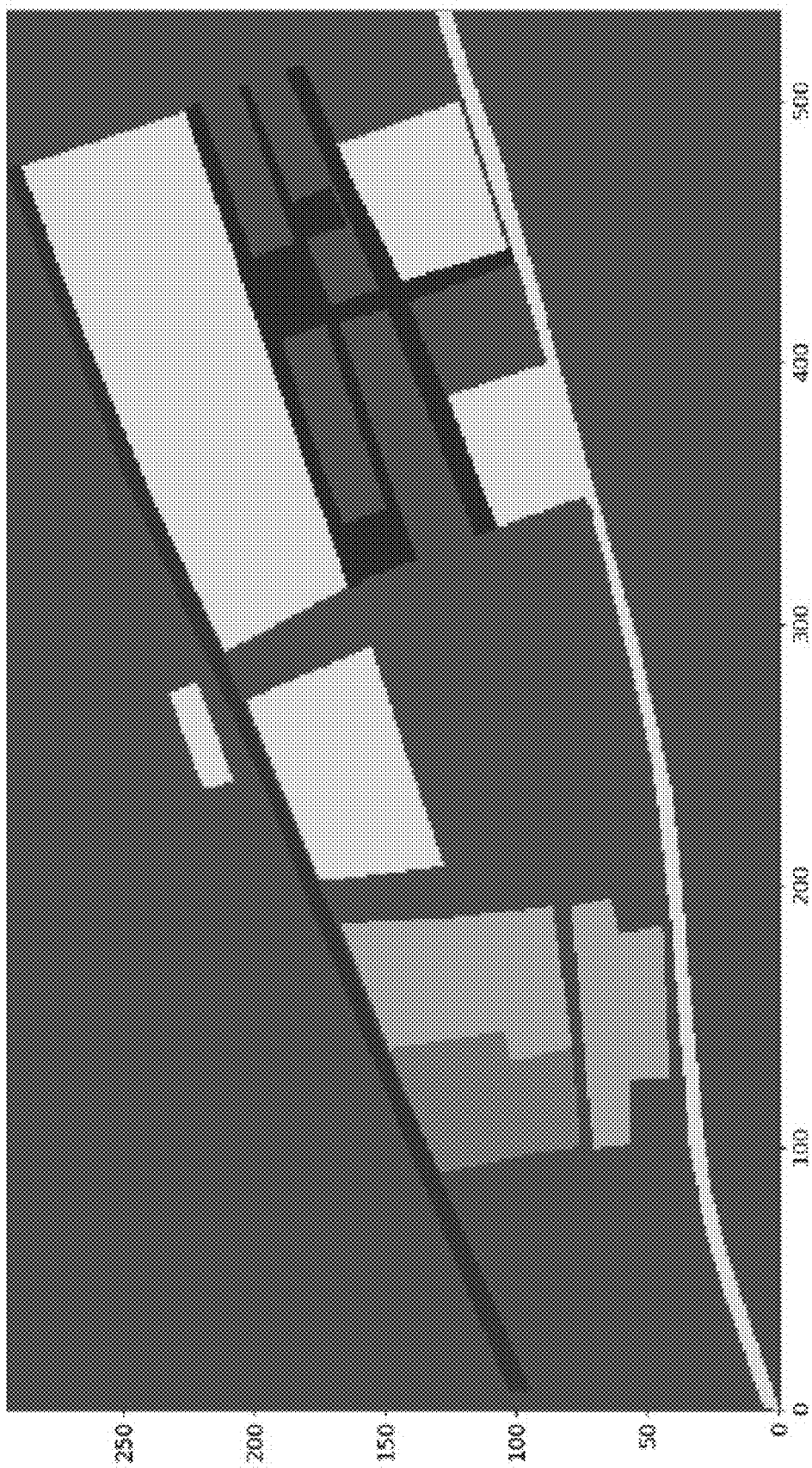
FIG. 9 illustrates a layer of a plurality of grids discretized from the three-dimensional environment similar to that as shown in FIG. 8, where different colors (gradings) represent different traversal cost of each grid cell.

By the present invention, the tested geographical region is discretized into a plurality of grid cells or nodes. Different traversal cost is assigned to each of the grid cells depending on whether the cell is within a free space, desired moving space, or not. According to a preferred embodiment of the present invention, the three-dimensional environment of the tested geographical region is converted into a two-dimensional graph, and each grid cell corresponds to a node in the graph, where each node connects with the nodes which have line-of-sight with. A path planning problem from an origin to a destination in a three-dimensional environment is converted into a graph-based path planning problem from a first node to a last node on the graph as-converted according to the method of the present invention. FIG. 9 shows a layer of the discretized three-dimensional grids, where different colors or gradings represent different traversal costs among different grid cells. During UAV operation, the other costs such as turning, climb/descending costs of the UAV will be added into the modified algorithm used in the present invention as a heuristic function, and the approximation of average non-uniform traversal cost instead of the product of the path length and the non-uniform traversal cost of each unblocked cell is used to speed up the line-of-sight check between every two nodes.

The foregoing description of the present invention has been provided for the purposes of illustration and description. It is not intended to be exhaustive or to limit the invention to the precise forms disclosed. Many modifications and variations will be apparent to the practitioner skilled in the art.

All or portions of the embodiments disclosed herein may be implemented using one or more of specially configured computing devices, computer processors, or electronic circuitries including but not limited to graphics processing units (GPUs), application specific integrated circuits (ASICs), field programmable gate arrays (FPGAs), and other programmable logic devices configured or programmed according to the teachings of the present disclosure. Computer instructions or codes running in the computing devices, computer processors, or programmable logic devices can readily be prepared by practitioners skilled in the software or electronic art based on the teachings of the present disclosure. The aforesaid one or more computing devices may include one or more of server computers, personal computers, laptop computers, mobile computing devices such as smartphones and tablet computers.

The electronic embodiments include computer-readable storage media having the computer instructions or codes stored therein, which can be used to configure or program the computing devices, computer processors, or electronic circuitries to perform any of the processes of the present invention; and to store data generated by any of the processes of the present invention. The computer-readable storage media include, but are not limited to, floppy disks, optical discs, Blu-ray Disc, DVD, CD-ROMs, magneto-optical disks, solid-state discs, ROMs, RAMs, SRAMs, DRAMs, flash memory devices, electrically programmable read-only memories (EPROMs), electrically erasable programmable read-only memories (EEPROMs), or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

INDUSTRIAL APPLICABILITY

The present invention is not just limited to the use in unmanned vehicles, but also in all possible transportations or moving objects requiring time- and cost-saving path planning and/or on-the-journey search, in particular, the designated vehicles need to travel from one location to the other in a highly variable and/or unpredictable environment. Approximation method of the non-uniform traversal cost proposed in the present invention is also applicable in other graph-based path planning algorithms, and should not be restricted to the algorithms mentioned as examples in the present disclosure. Addition and approximation of other costs specific to unmanned aerial vehicle into the calculation of the optimal path according to certain embodiments of the present invention also provides a solution to other unmanned vehicles which their corresponding operation cost is largely dependent on the vehicle dynamics. Also described herein as one of the aspects, the present invention is also applicable to any other fields requiring path planning not just limited to the shortest possible path but also taking non-uniform traversal cost into account when computing the optimal path.

What is claimed is:

1. A computer-implemented method for planning an optimal three-dimensional path for autonomous flying robots to traverse from one location to the other in a geographical region and for controlling the autonomous flying robots to fly along the optimal three-dimensional path, including:

translating the geographical region into a three-dimensional environment, by a computer processor;

discretizing the three-dimensional environment into a graph comprising a plurality of three-dimensional cells or nodes, by the computer processor;

deriving a path between a first node and a last node in the graph to be traversed by the autonomous flying robots, by the computer processor;

assigning a weighting factor to each of the nodes, the weighting factor being associated with traversal cost of the autonomous flying robots in each of the nodes, and calculating the traversal cost of the autonomous flying robots from one node to the other along the path, by the computer processor;

checking line-of-sight between the first node and the last node of the path, by the computer processor;

adding other costs into an any-angle path planning algorithm and approximating thereof to generate a natural and smooth path compatible with vehicle dynamics of the autonomous flying robots in order to obtain the optimal three-dimensional path of the autonomous flying robots between two locations in the geographical region, by the computer processor, wherein the optimal three-dimensional path is stored in computer-readable storage media, wherein the other costs of the path include turning costs of the autonomous flying robots between two consecutive segments within the path, as well as climbing costs and descending costs of the autonomous flying robots at one or more segments within the path, respectively, wherein the turning costs of the autonomous flying robots comprise the costs involved in adjusting, meeting or overcoming horizontal turning angle, adjacent turning distance, and consecutive turning decay of the autonomous flying robots, wherein the climbing or descending costs comprise the costs involved in adjusting, meeting or overcoming climbing or descending angle, linear weight cost multiplier, climbing or descending angle threshold of the autonomous flying robots; and controlling an objective autonomous flying robot to fly along the optimal three-dimensional path by the method.

2. The method of claim 1, wherein the autonomous flying robots comprise unmanned aerial vehicles (UAVs), micro aerial vehicles (MAS), and alike used in unmanned aerial system (UAS).

3. The method of claim 1, wherein the calculation of the traversal cost is based on an approximation method that the traversal cost of a path is an average cost of the traversed cells on the path.

4. The method of claim 1, wherein the cell size is assumed to substantially zero when calculating the traversal cost.

5. The method of claim 1, wherein the other costs of the path is calculated by converting the path into a plurality of segments each representing a partial path to be traversed by the autonomous flying robots, determining relative horizontal and/or vertical orientations of the autonomous flying robots between every two consecutive segments, and calculating the costs in addition to the traversal cost of the path on changing the autonomous flying robots from one orientation to the other according to the determined relative horizontal and/or vertical orientations between the two consecutive segments.

6. The method of claim 1, wherein the other costs of the path are added into the any-angle path planning algorithm as corresponding terms to heuristics of the algorithm.

7. The method of claim 1, wherein the shortest possible three-dimensional path is calculated according to the following equations:

$$f(\text{cell}) = \frac{1}{\text{size}(S)} \|lineSegment(\text{cell}, \text{parent}(\text{cell}))\|_2 \quad (4)$$

$$\sum_{c \in S}(costCoef(c)) \quad (5)$$

$$S = voxelTraversal(\text{cell}, \text{parent}(\text{cell})) \quad (6)$$

wherein f(cell) is an estimate of the length of a shortest path from a parent grid cell to a grid cell on a line segment of the path in the graph.

8. The method of claim 7, further comprising penalizing paths inducing unnecessary or excessive turns for the autonomous flying robots according to the following equations:

$$f(s) + g(s) + h(s) + t(s) \quad (7)$$

$$t(s) = \gamma_t t(\text{parent}(s)) + \lambda \phi(s)\left(1 + \eta e^{\frac{\|\lambda_1\|}{d_0}}\right) \quad (8)$$

$$\phi(s) = \left|\arccos\left(\frac{l_1 \cdot l_2}{\|l_1\| \|l_2\|}\right)\right| \quad (9)$$

-continued $$l_1 = s - \text{parent}(s) \quad (10)$$

$$l_2 = \text{parent}(s) - \text{parent}(\text{parent}(s)) \quad (11)$$

wherein Ø(s) represents a linear function of the turning angle between every two consecutive line segments of the path; λ is the linear weight which is tunable as a trade-off between path length and turning cost of the autonomous flying robots, and wherein assuming each turn is very close to a consecutive turn, if previous segment length $\|l_1\|$ is sufficiently short, it will be penalized, and wherein a decay factor $\gamma_t$ is added to the calculation of the turning cost in the parent cell when there is/are consecutive turn(s).

9. The method of claim 8, wherein the other costs are calculated by the following equations:

$$f(s) + g(s) + h(s) + t(s) + c(s) \quad (12)$$

$$c(s) = \lambda_c \gamma(s) \|l_1\| \quad (13)$$

$$\gamma(s) = \begin{cases} \left|\arcsin\left(\frac{l_1 \cdot n}{\|l_1\|}\right)\right| & \text{penalize climbing and descending} \\ \arcsin\left(\frac{l_2 \cdot n}{\|l_1\|}\right) & \text{penalize climbing} \end{cases} \quad (14)$$

$$l_1 = s - \text{parent}(s) \quad (15)$$

$$n = \begin{bmatrix} 0 \\ 0 \\ 1 \end{bmatrix} \quad (16)$$

wherein g(s) represents the length of the shortest path from start vertex parent(s) to vertex s, and thereby being an estimated start distance of vertex s; h(s) represents an estimated goal distance of vertex s; t(s) represents the traversal cost obtained from Eq. (8); c(s) represents other costs in addition to t(s) during operation of the autonomous flying robots.

10. The method of claim 9, wherein the cost function obtained by Eq. (13) is changed to a piece-wise function as follows:

$$c(s) = \begin{cases} \lambda_c \gamma(s) |l_1| & \gamma(s) \le \varepsilon_c \\ +\infty & \gamma(s) > \varepsilon_c \end{cases} \quad (17)$$

wherein the other costs involved in adjusting climb or descending angle of the autonomous flying robots c(s) traversing from the start vertex to vertex s do not exceed an absolute threshold $\varepsilon_c$, and wherein s and parent(s) are considered to be located in two different terminal areas where the autonomous flying robots takes off from and lands to, respectively, in order not to overwhelm the other costs.

11. The method of claim 1, wherein objects and/or obstacles with a uniform shape and location in the geographical region are converted into convex polyhedrons or polygons in the graph after said translating and prior to said discretizing into the plurality of cells or nodes.

12. A computer-implemented method for planning an optimal three-dimensional path for autonomous flying robots to traverse from one location to the other in a geographical region and for controlling the autonomous flying robots to fly along the optimal three-dimensional path, including:

translating the geographical region into a three-dimensional environment, by a computer processor;

discretizing the three-dimensional environment into a graph comprising a plurality of three-dimensional cells or nodes, by the computer processor;

deriving a path between a first node and a last node in the graph to be traversed by the autonomous flying robots, by the computer processor;

assigning a weighting factor to each of the nodes, the weighting factor being associated with traversal cost of the autonomous flying robots in each of the nodes, and calculating the traversal cost of the autonomous flying robots from one node to the other along the path, by the computer processor;

checking line-of-sight between the first node and the last node of the path, by the computer processor;

adding other costs into an any-angle path planning algorithm and approximating thereof to generate a natural and smooth path compatible with vehicle dynamics of the autonomous flying robots in order to obtain the optimal three-dimensional path of the autonomous flying robots between two locations in the geographical region, by the computer processor, wherein the optimal three-dimensional path is stored in computer-readable storage media, wherein the other costs of the path include costs at least associated with turning costs of the autonomous flying robots between two consecutive segments within the path and involved in adjusting, meeting or overcoming horizontal turning angle, adjacent turning distance, and consecutive turning decay of the autonomous flying robots; and controlling an objective autonomous flying robot to fly along the optimal three-dimensional path by the method.

13. The method of claim 12, wherein the cell size is assumed to substantially zero when calculating the traversal cost.

14. The method of claim 12, wherein the other costs of the path are added into the any-angle path planning algorithm as corresponding terms to heuristics of the algorithm.

15. A computer-implemented method for planning an optimal three-dimensional path for autonomous flying robots to traverse from one location to the other in a geographical region and for controlling the autonomous flying robots to fly along the optimal three-dimensional path, including:

translating the geographical region into a three-dimensional environment, by a computer processor;

discretizing the three-dimensional environment into a graph comprising a plurality of three-dimensional cells or nodes, by the computer processor;

deriving a path between a first node and a last node in the graph to be traversed by the autonomous flying robots, by the computer processor;

assigning a weighting factor to each of the nodes, the weighting factor being associated with traversal cost of the autonomous flying robots in each of the nodes, and calculating the traversal cost of the autonomous flying robots from one node to the other along the path, by the computer processor;

checking line-of-sight between the first node and the last node of the path, by the computer processor;

adding other costs into an any-angle path planning algorithm and approximating thereof to generate a natural and smooth path compatible with vehicle dynamics of the autonomous flying robots in order to obtain the optimal three-dimensional path of the autonomous flying robots between two locations in the geographical region, by the computer processor, wherein the optimal three-dimensional path is stored in computer-readable storage media, wherein the other costs of the path include costs at least associated with climbing costs and descending costs of the autonomous flying robots at one or more segments within the path, respectively, wherein the climbing or descending costs comprise the costs involved in adjusting, meeting or overcoming climbing or descending angle, linear weight cost multiplier, climbing or descending angle threshold of the autonomous flying robots; and controlling an objective autonomous flying robot to fly along the optimal three-dimensional path by the method.

16. The method of claim 15, wherein the cell size is assumed to substantially zero when calculating the traversal cost.

17. The method of claim 15, wherein the other costs of the path are added into the any-angle path planning algorithm as corresponding terms to heuristics of the algorithm.

\* \* \* \* \*